United States Patent [19]

Langdon

[11] Patent Number: 5,026,162
[45] Date of Patent: Jun. 25, 1991

[54] OPTICAL INTERFERENCE POSITION MEASUREMENT SYSTEM

[75] Inventor: Roger M. Langdon, Colchester, United Kingdom

[73] Assignee: General Electric Company, p.l.c., London, United Kingdom

[21] Appl. No.: 349,229

[22] Filed: May 9, 1989

[30] Foreign Application Priority Data

May 10, 1988 [GB] United Kingdom ............... 8811027

[51] Int. Cl.$^5$ .............................................. G01B 9/02
[52] U.S. Cl. .................................. 356/354; 356/356; 356/363
[58] Field of Search ............... 356/354, 356, 358, 363, 356/375, 349; 250/237 G

[56] References Cited

U.S. PATENT DOCUMENTS 3,881,105 4/1975 DeLang et al. .................... 356/351
3,891,321 6/1975 Hock .
4,725,146 2/1988 Hutchin .

FOREIGN PATENT DOCUMENTS 1364487 8/1974 United Kingdom .

Primary Examiner—Samuel Turner
Attorney, Agent, or Firm—Spencer & Frank

[57] ABSTRACT

A position measurement system transmits moving interference pattern and these are received by a sensor fixed relative to the transmitter and a mobile sensor, by comparing the phases of the interference pattern at the two sensors the position of the mobile sensor relative to the transmitter can be calculated.

7 Claims, 5 Drawing Sheets

OPTICAL INTERFERENCE POSITION MEASUREMENT SYSTEM

BACKGROUND OF THE INVENTION

This invention relates to optical position measurement systems, especially those used to measure the position of robot arms.

One known optical position measurement system uses a light source mounted on a mobile object cooperating with a fixed diffraction grating to produce a pattern of interference fringes. When the object, and thus the light source, move relative to the diffraction grating the fringe patterns will also move. By measuring the intensity of the fringe patterns using a photodetector fixed relative to the diffraction grating it is possible to calculate changes in the position of the object because, as the light source moves relative to the grating, the interference pattern will also move relative to the grating.

The main drawback of such systems is that the intensity measured by the photodetector can be altered for many reasons other than movement of the light source, such as changes in the various light generating and detecting elements and in the absorbtion and scattering of light between transmission and reception due to smoke or dust in the air.

This invention is intended to produce an optical position measurement system overcoming these problems.

SUMMARY OF THE INVENTION

This invention provides an optical interference position measurement method using a light sensor in which light from the light source is used to generate a moving interference pattern which falls on the light sensor, and the phase of this interference pattern is compared with the phase of a reference signal in order to measure the relative angular positions of the light source and light sensor.

This invention also provides an optical interference position measurement system comprising a light source, a light sensor, a phase comparator and an interference pattern generator, arranged so that, in use, light from the light source is used by the interference pattern generator to generate a moving interference pattern which falls on the light sensor and the phase comparator compares the phase of this interference pattern with the phase of a reference signal thereby providing an indication of the relative angular positions of the light source and the light sensor.

BRIEF DESCRIPTION OF THE DRAWINGS

A number of systems employing the invention will now be described with reference to the accompanying figures in which.

DESCRIPTION OF THE PREFERRED EMBODIMENTS

Figure 1:
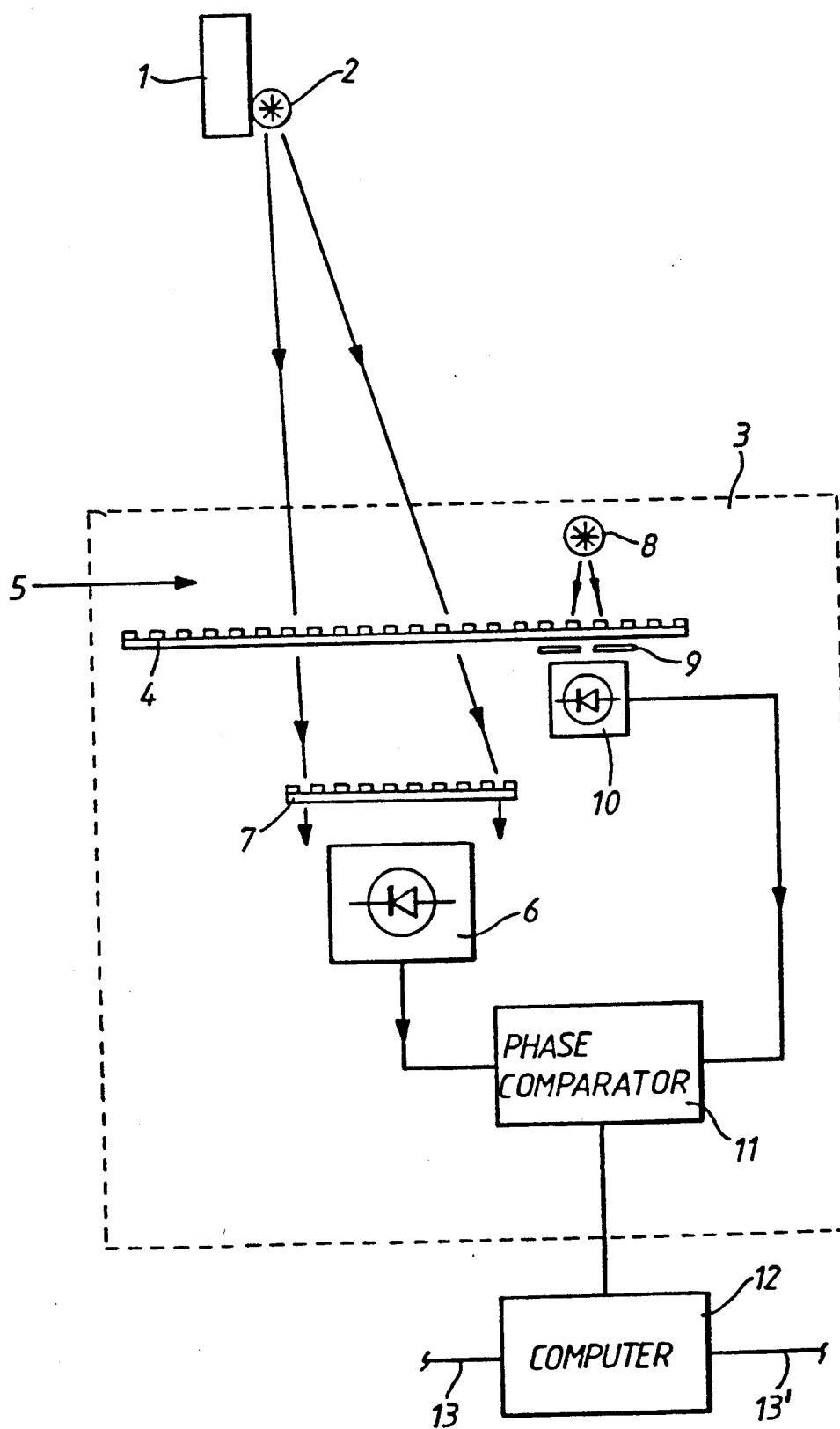
FIG. 1 shows a position measurement system employing the invention in schematic and block diagram form.

Referring to FIG. 1, a robot arm 1 has a laser diode 2 rigidly mounted onto it. Light from the laser diode 2 radiates in all directions and some of the light falls on a remote bearing measurement system 3 mounted at the edge of the robot arm's working volume.

The light falling on the bearing measurement system 3 passes through a moving diffraction grating 4 formed on the edge of a transparent rotating disc. The disc is viewed edge on in FIG. 1 and is rotating about an axis parallel to the plane of the paper such that the section of moving diffraction grating 4 moves in the direction 5. These interference fringes are observed by a photodetector 6 after passing through a second, fixed, diffraction grating 7.

A light source 8 fixed in the bearing measurement system 3 also sends light through the moving diffraction grating 4; this light then passes through a fixed slit 9 and is received by a second photodetector 10.

The signals from the two photodetectors 6 and 10 are supplied to a phase comparator 11. Both of these signals will be sinusoidally modulated at the same frequency, this frequency depending on the rotational speed and line spacing of the moving diffraction grating 4. The relative phase of the two signals will be fixed so long as the laser diode 2 remains at a constant bearing to the bearing measurement system 3. When the bearing of the laser diode 2 changes the phase difference between the two signals will alter; however the phase difference will remain constant if the rotational speed of the diffraction grating 4 alters. The output of the phase comparator 11 is supplied to a computer 12 which keeps track of the number of cycles of phase shift that occur and uses an algorithm to calculate from this the angular movement, relative to the bearing measurement system 3, of the laser diode 2.

The computer 12 will also receive phase measurements along lines 13 and 13' from two more bearing measurement systems similar to bearing measurement system 3 but oriented differently and separated from system 3 so as to allow calculation of the position of the laser diode 2 in three dimensions.

Since the system can only measure changes in a bearing it is necessary for the robot arm to be placed in a reference position for calibration when the system is first switched on.

The main problem with such a system is the necessity for a mechanically movable diffraction grating, and inevitably any mechanical moving part produces problems of wear, reliability and stability.

Figure 2:
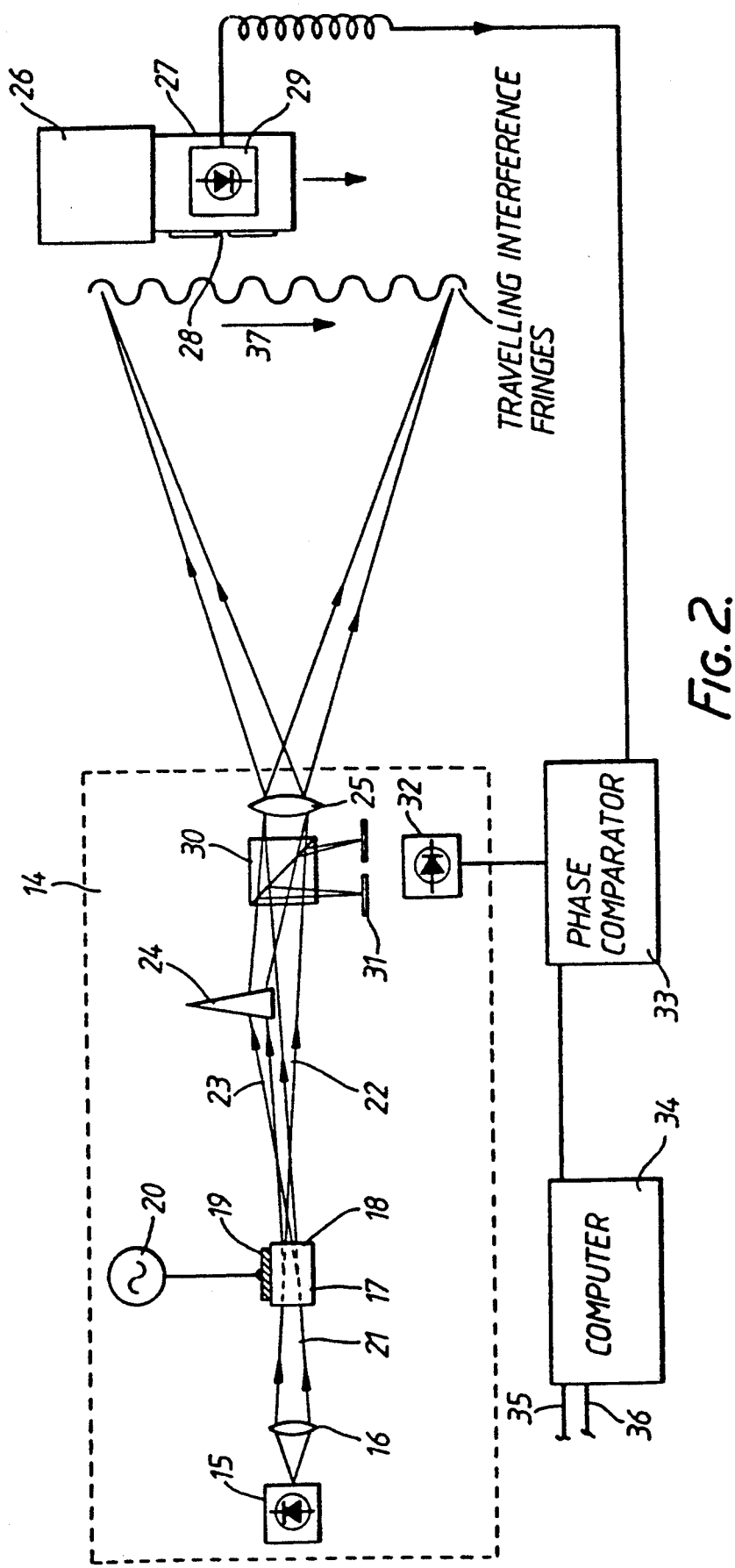
FIG. 2 shows another position measurement system employing the invention in schematic and block diagram form.

Referring to FIG. 2 an interference pattern transmitter 14 contains a laser diode 15. A lens 16 focusses light from the laser diode 15 into a beam 21 which passes through an acousto-optic modulator 17. The acousto-optic modulator 17 comprises a Bragg cell 18 into which acoustic waves are projected by an electro-acoustic transducer 19. A signal source 20 supplies a voltage alternating at 20MHz to the electro-acoustic transducer 19.

As a result, a Bragg diffraction occurs in the Bragg cell between the light beam 21 from the laser diode and the acoustic waves in the Bragg cell 18, producing two light beams, a first unrefracted beam 22 having the same frequency as the beam 21 entering the Bragg cell and a second refracted beam 23 having a slightly altered frequency to the beam 21 entering the Bragg cell due to doppler shifting, the difference in frequency being 20MHz, the modulation frequency of the Bragg cell.

A prism 24 is in the path of the second beam 23 and deflects it so that it intersects the first beam 22. If the two beams were at the same frequency this would produce a static interference pattern, but because the beams are at frequencies differing by 20MHz they generate an interference pattern moving at a frequency of 20MHz, that is to say the peaks of intensity of the interference pattern will pass a fixed point at a rate of twenty million a second. The interference fringes travel in the direction of the arrow 37.

A microscope objective lens 25 disposed in the path of the two beams spreads the interference pattern across a wide angle.

The interference pattern transmitter 14 is secured at a fixed position so that the interference pattern it produces is projected over the whole working volume of a robot 26.

The robot 26 has fixed to it a receiver 27. The receiver 37 has a slit 28 through which the interference pattern from the transmitter 14 is incident on a photodetector 29.

Within the transmitter 14 a beam splitter 30 deflects a part of the beams 22 and 23 so that the resulting interference pattern falls on a fixed slit 31. Light passing through the fixed slit 31 falls on a reference photodetector 32.

The signals from the two photodetectors 29 and 32 are compared by a phase comparator 33. Any changes in the relative phases of the two signals must be due to angular movement of the receiver 27 relative to the transmitter 14. The phase difference signal is supplied to a computer 34 which also receives signals on lines 35 and 36 from two other similar systems at different points around the working volume of the robot and scanning in different planes. The computer 34 keeps count of the number of phase cycles by which the phase signals vary and using an algorithm can calculate from this the three dimensional position of the robot 26.

Again this system can only measure changes in position and must start with the robot in a known reference position for calibration in order to measure the absolute position of the robot.

Figure 3:
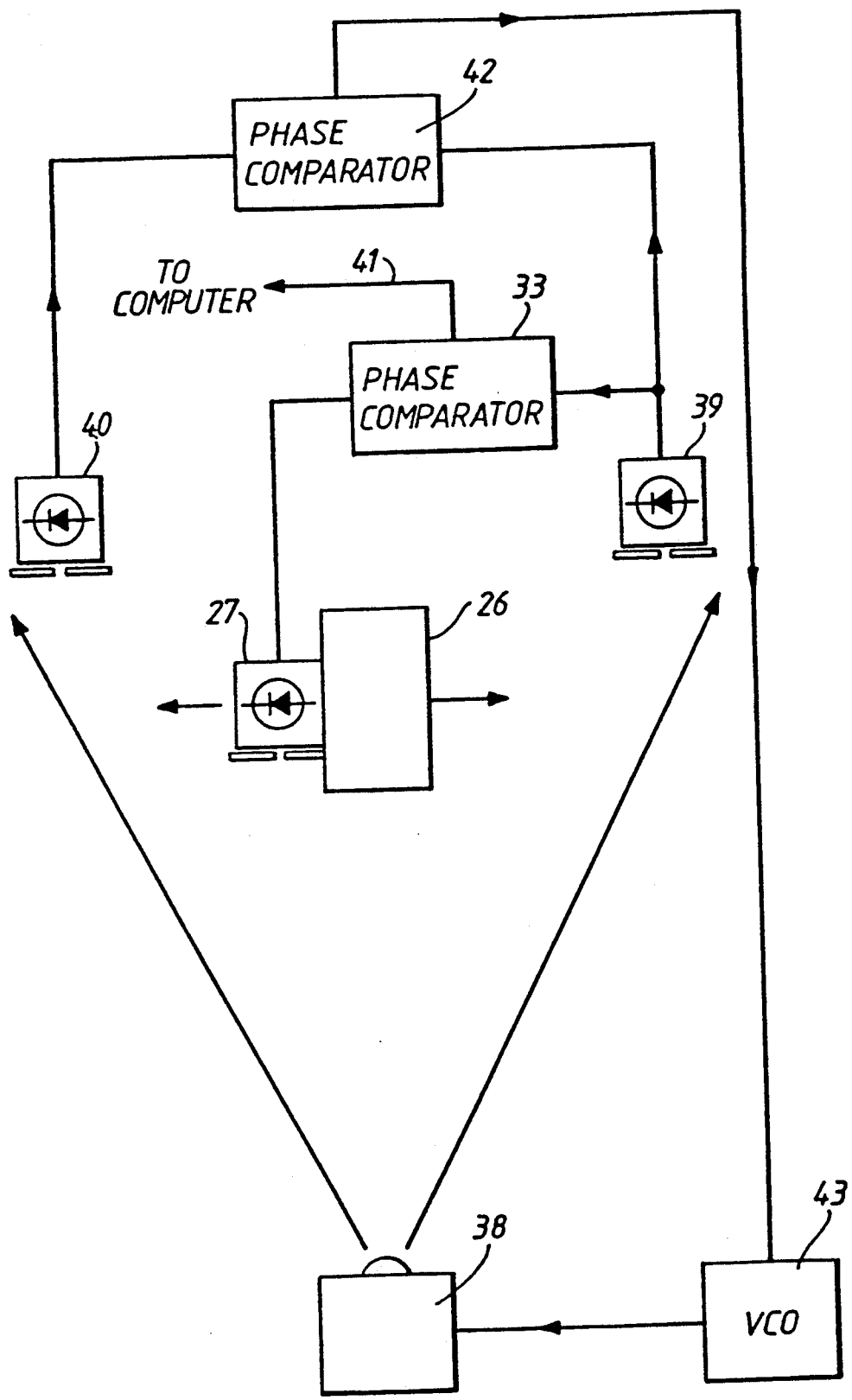
FIG. 3 shows a modified form of the system of FIG. 2 in schematic and block diagram form.

Temperature changes can alter the fringe spacings by thermal expansion and contraction, as well as changes in the refractive index of the laser diode 15, lenses 16 and 25 and the prism 24 and also changes in the acousto-optical properties of the Bragg cell 18. In order to compensate for such variations the system shown in FIG. 3 is used. An interference pattern transmitter 38 projects an interference pattern over the working volume of a robot 26, the interference pattern transmitter 38 is identical to the interference pattern transmitter 14 except that it does not contain the beam splitter 30, slit 31 and photo detector 32. This interference pattern is detected by the receiver 27 attached to the robot 26 and a pair of reference receivers 39 and 40 at fixed positions relative to the transmitter 38, each reference receiver being identical to the receiver 27.

The signals from the receiver 27 on the robot 26 and the first reference receiver 39 are compared by a phase comparator 33 which provides a signal corresponding to the phase difference between these two input signals along a line 41 to the computer 34, which operates on them as described with reference to FIG. 2.

The signals from the two reference receivers 39 and 40 are compared by a phase comparator 42. Since the positions of the two reference receivers 39 and 40 are fixed any change in the relative phases of their outputs must be due to a change in the spacing of the interference pattern generated by the transmitter 38. The output of the phase comparator 42 is supplied to a voltage controlled oscillator (V.C.O) 43, which replaces the fixed frequency signal source 20 in supplying a signal to the electro-acoustic transducer 19. The frequency of the signal supplied to the electro-acoustic transducer 19 by the V.C.O. 43 is controlled by the voltage of the signal from the phase comparator 42, so if the spacing of the interference pattern varies the change in relative phase of the signals from the two reference receivers 39 and 40 will cause the output of the phase comparator 42 to change and alter the frequency of the V.C.O. 43 so that the spacing of the interference pattern returns to its original value.

Figure 4:
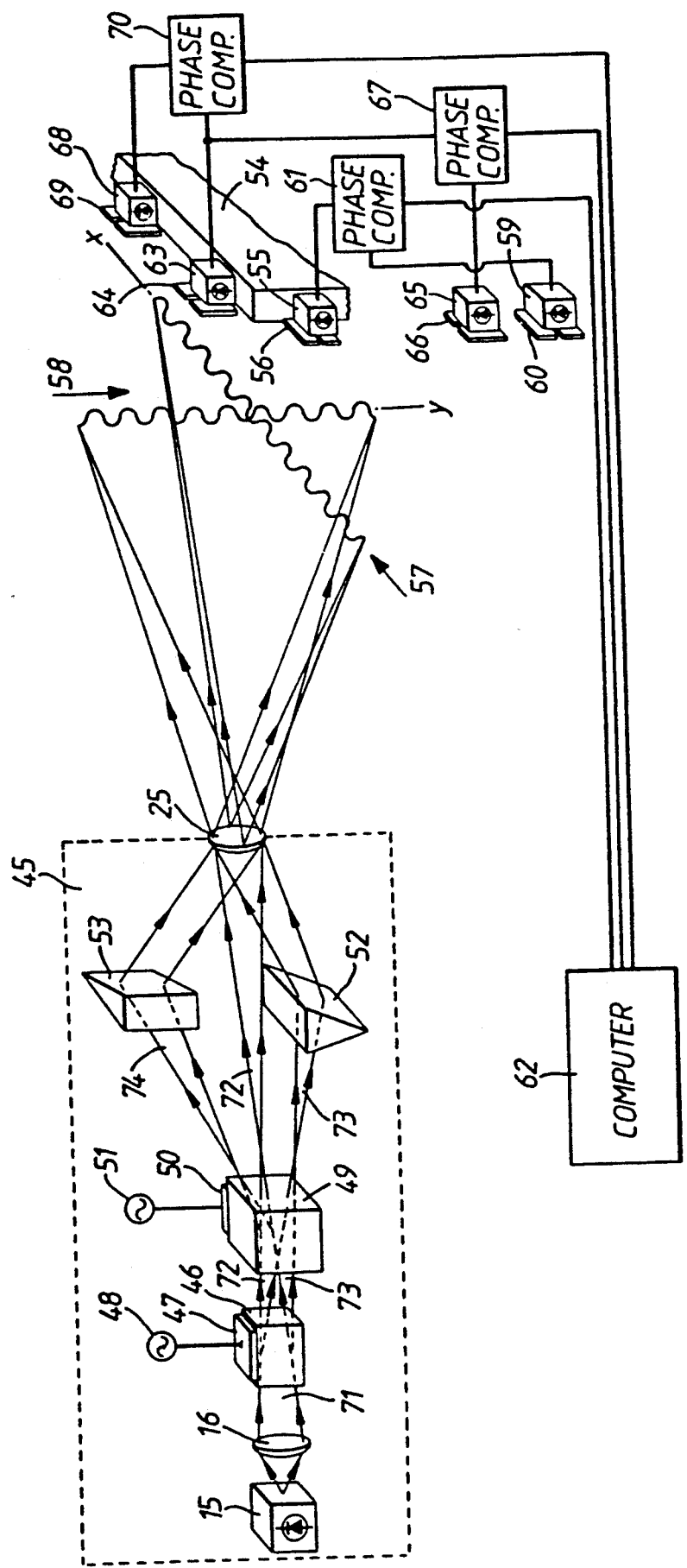
FIG. 4 shows a further position measurement system employing the invention in schematic and block diagram form.

Referring to FIG. 4, a system able to calculate the position of a robot 54 in three dimensions using a single interference pattern transmitter 45 is shown.

The transmitter 45 contains a laser diode 15, the light from the laser diode 15 is focussed into a beam 71 by a lens 16. The focussed light beam then passes into a first Bragg cell 46. The first Bragg cell 46 has acoustic waves fed into it by an electro-acoustic transducer 47 which is in turn supplied with a 20MHz electrical signal by a first signal source 48. Bragg diffraction in the Bragg cell 46 splits the light from the laser diode 15 into a first beam 72 which passes straight through the Bragg cell 46 and a second beam 73 which undergoes Bragg diffraction in the y direction and changes frequency by 20MHz due to doppler shifting.

The first and second beams 72 and 73 then pass through a second Bragg cell 49. This Bragg cell 49 is supplied with acoustic waves perpendicular to those in the first Bragg cell 46 by an electro-acoustic transducer 50 which is supplied with a 20MHz electrical signal by a second signal source 51. The first straight through beam 72 from the first Bragg cell 46 is split by Bragg diffraction into a third beam 74 deflected in the direction x and having its frequency changed by 20MHz due to doppler effects and the remainder of the first beam 72 which passes straight through without any frequency shifting. The second, deflected beam 73 from the first Bragg cell 46 passes straight throught the second Bragg cell 49 without undergoing any Bragg diffraction because it is at a different angle to the first beam 72 and the second Bragg cell 19 is arranged to interact with the first beam 72.

The second beam 73 passes into prism 52 and is deflected so that it intersects the first beam 72. The third beam 74 passes into a prism 53 and is deflected so that it intersects the first beam 72 at the same spot as the second beam 73.

The interaction of the three beams 72, 73 and 74 produces two interference fringe patterns, the first in the direction x and the second in the direction y, and each moving at a frequency of 20MHz in the direction of the arrows 57 and 58 respectively. These interference fringes are spread out to cover a wide angular volume by a microscope objective lens 25.

Robot 54 has a first photodetector 55 mounted behind a slit 56 in the x direction. A second reference photodetector 59 behind a slit 60 oriented in the x direction is at a fixed position in the volume of projection of the interference patterns. The orientation of the slits 56 and 60 in the x direction make the photodetectors 55 and 59 sensitive only to interference patterns in the y direction. Then signals from the first and second photodetectors 55 and 59 are compared in a phase comparator 61 and a phase difference signal sent from the phase comparator 61 to a computer 62. The computer 62 uses the phase difference between the signals from the first and second photodetector 55 and 59 to calculate the angular position of the robot 54 in the y plane keeping a record of the number of full cycles of phase shift that occur.

A third photodetector 63 behind a slit 64 in the y direction is mounted on the robot and a fourth photodetector 65 behind a slit 66 in the y direction is at a fixed position in the volume of projection of the interference fringes. The orientation of the slits 64 and 66 in the y direction makes the photodetectors 63 and 65 sensitive only to interference patterns in the x direction. The signals from the third and fourth photodetectors 63 and 65 are compared in a phase comparator 67. The phase difference signal from the phase comparator 67 is supplied to the computer 62 which keeps a record of the number of full cycles of phase shift and calculates the angular position of the robot 54 in the x plane from the phase difference.

A fifth photodetector 68 behind a slit 69 in the y direction is mounted on the robot at a known distance from the third photodetector 63. The signals from the third and fifth photodetectors 63 and 68 are compared by a phase comparator 70, and the phase difference supplied to the computer 62. The separation of the photodetectors 63 and 68 is fixed, so any change in the relative phases of the signals they produce must be due to a change in their angular separation measured from the transmitted 45, so any such change must be due to a change in the radial distance between the transmitter 45 and the robot 54. The computer keeps a record of the number of full phase cycles that the signal has passed through and calculates the distance of the robot 45 from the transmitter 45.

Since this system can only measure changes in position it is necessary to start with the robot in some known reference position.

Figure 5:
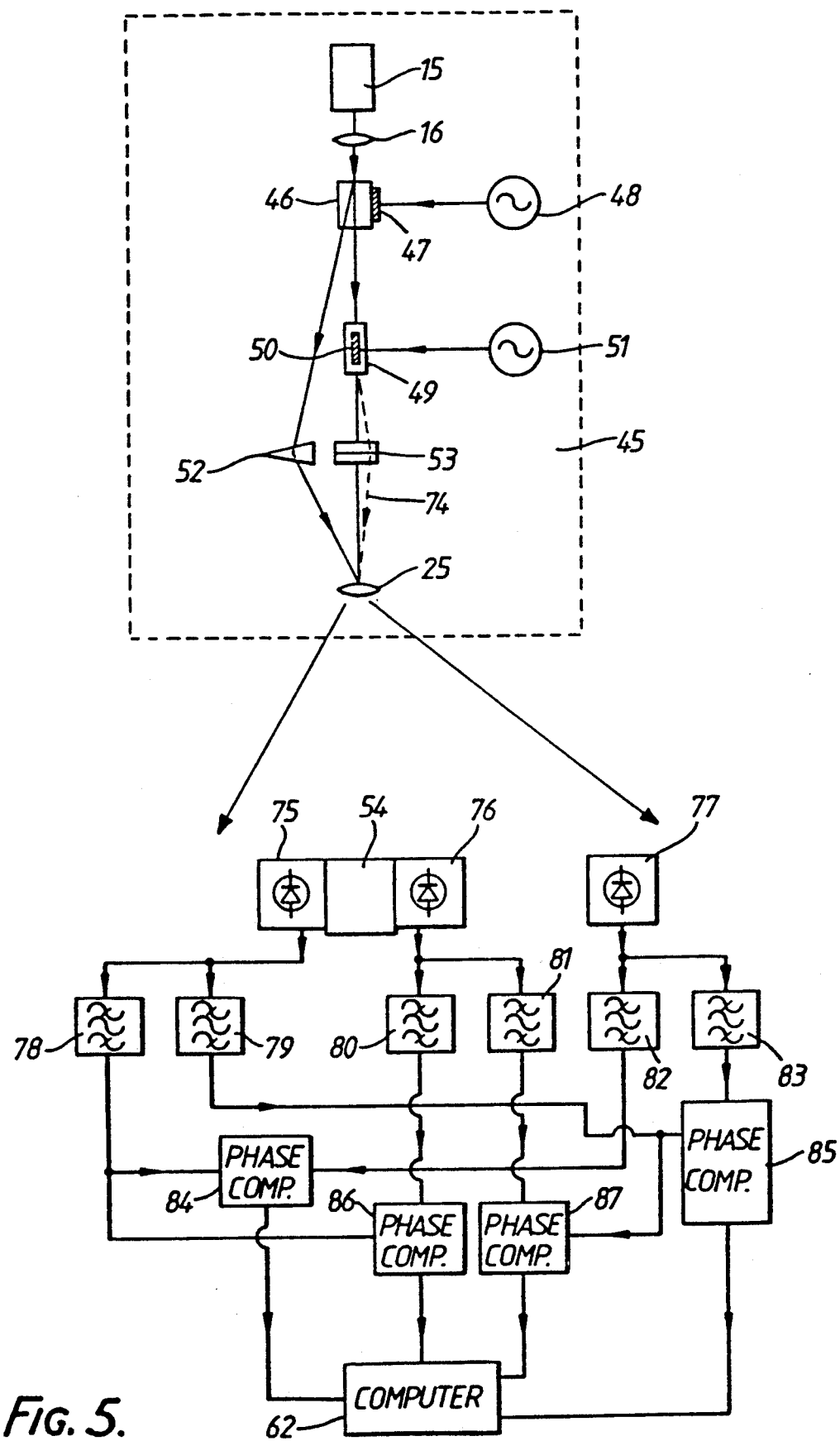
FIG. 5 shows another position measurement system employing the invention in schematic and block diagram form, wherein identical parts having the same reference numerals throughout.

Referring now to FIG. 5, a transmitter 45, essentially similar to that described with reference to FIG. 4, projects moving fringes over the operating volume of robot 54. The second acousto-optic modulator 49 is driven from a source 51 via electro-acoustic transducer 50 by an alternating voltage at a fixed frequency of 25MHz and the first acousto-optic modulator 47 is driven at a frequency of 20MHz by source 48. The fringe pattern moving across the operating volume of robot 54 thus contains fringes moving in the x direction with a periodicity of 20 MHz and in the y direction with a periodicity of 25MHz.

The robot 54 has a pair of photodetectors 75, 76 attached to it which intercept the moving fringe pattern from transmitter 45. An additional photodetector 77 is placed at a reference position outside the operating area of robot 45. Photodetectors 75, 76, 77 have apertures that are small in comparison with the spatial separation of the fringes in the x and y directions, and so produce output photocurrent modulated at both fringe frequencies of 20 and 25MHz. The outputs from the photodetectors 75, 76 and 77 are passed to filters 78, 80 and 82 respectively. Each of these filters is tuned to pass a narrow band of frequencies a few kilohertz wide centered on 20MHz. The outputs from the photodetectors 75, 76 and 77 are also passed to filters 79, 81 and 83 respectively. Each of these filters are tuned to a narrow band of frequencies centered on 25MHz. The phases of the outputs from the filters 78 and 82 are compared by the phase comparator 84 which provides an output to a computer 62 from which the angular separation in the x direction of the photodetectors 75 and 77 relative to the transmitter 45 can be calculated. Similarly outputs from the filters 79 and 83 are compared in phase by the phase comparator 85 which provides an output to the computer 62 from which the angular separation in the y direction of the photodetectors 75 and 77 relative to the transmitter 45 can be calculated.

The outputs from the filters 78 and 80 are compared in phase by the phase comparator 86 giving an output dependent on the number of fringes in the x direction between the photodetectors 75 and 76. Similarly the outputs from the filters 79 and 81 are compared in phase by the phase comparator 87 giving an output indicating the number of fringes in the y direction between the photodetectors 75 and 76. Comparing the outputs from the phase detectors 86 and 87 in computer 62 enables the tangent of the angle of the line joining the phase detectors 75 and 76 to be calculated relative to x and y coordinates and also the perpendicular distance from the photodetectors 75 and 76 to the transmitter 45 to be calculated. Thus both the orientation about the z axis and the magnitude of the z coordinate of the robot 54 relative to the transmitter 45 can be calculated to obtain additional information on the robots position and orientation. Additional transmitters of the type similarly to the transmitter 45 but operating at different modulation frequencies can be placed in different positions around the operating volume of the robot 54. Signals from the photodetectors 75, 76 and 77 are passed to additional filters tuned to the additional modulation frequencies and compared in phase to obtain the coordinates and angles of orientation of robot 54 relative to the additional transmitters. In this way the complete linear and angular coordinates of the robot can be derived.

I claim:

1. An optical position measurement system comprising a light source, a light sensor, a phase comparator, means for generating a reference signal and an interference pattern generator including a Bragg cell for receiving light from the light source, wherein the Bragg cell splits the light received by the interference pattern generator into two beams by Bragg diffraction and the two resultant beams interfere to generate a moving interference pattern which falls on the light sensor, and the phase comparator compares the phase of the moving interference pattern with the phase of a reference signal thereby producing an indication of the relative angular positions of the light source and light sensor.

2. A system as claimed in claim 1 in which the interference pattern generator is a Bragg cell and, in use, light from the light source is split into two beams by Bragg diffraction in the Bragg cell and the two beams interfere to produce a moving interference pattern.

3. A system as claimed in claim 2, wherein said means for generating a reference signal comprises a second light sensor disposed at a fixed position relative to the light source, the moving interference pattern falling on the second light sensor to produce the reference signal.

4. A system as claimed in claim 1, wherein said means for generating a reference signal comprises a second light sensor at a fixed position relative to the light source, the moving interference pattern falling on the second fixed light sensor to produce the reference signal.

5. An optical measurement system comprising first and second light sources, first and second light sensors, a phase comparator and an interference pattern generator including a moving diffraction grating, wherein light from the first light source passes through the moving diffraction grating to produce a moving interference pattern which falls on the first light sensor, the second light source and second light sensor being in fixed positions relative to the moving diffraction grating such that light from the second light source passes through the moving diffraction grating and falls on the second light sensor generating a reference signal, the phase comparator serving to compare the phase of the moving interference pattern with the phase of the reference signal thereby producing an indication of the relative angular positions of the first light source and the first light sensor.

6. An optical position measurement method using a movable light source and a fixed light source comprising the following steps:
   transmitting light from the movable light source so that it passes through a moving diffraction grating producing a moving interference pattern;
   transmitting light from the fixed light source so that it passes through the moving diffraction grating generating a reference signal; and
   comparing the phase of said moving interference pattern with the phase of said reference signal thereby producing an indication of the relative angular positions of the movable and fixed light sources.

7. An optical position measurement method comprising the steps of:
   transmitting light of a predetermined frequency from a fixed light source;
   dividing said light into a first beam of the predetermined frequency and a second beam of a second frequency, said second frequency resulting from a doppler shifting of the predetermined frequency;
   deflecting said second beam so that it intersects said first beam to generate a moving interference pattern;
   detecting said moving interference pattern by use of a movable light sensor;
   splitting a part of the first beam and a part of the second deflected beam from the first and second beams, to form a reference signal;
   detecting the reference signal formed by the split first and second beams via a sensor fixed relative to the light transmitter; and
   comparing the phase of the moving interference pattern with the phase of the reference signal, thereby producing an indication of the relative angular positions of the fixed light source and the movable light sensor.

* * * * *